(12) United States Patent
Filstein (10) Patent No.: US 12,071,850 B2
(45) Date of Patent: Aug. 27, 2024

(54) OPTIMIZING STEAM AND SOLVENT INJECTION TIMING IN OIL PRODUCTION

(71) Applicant: ConocoPhillips Company, Houston, TX (US)

(72) Inventor: Alex Filstein, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 81 days.

(21) Appl. No.: 18/049,304

(22) Filed: Oct. 25, 2022

(65) Prior Publication Data

US 2023/0147327 A1    May 11, 2023

Related U.S. Application Data

(60) Provisional application No. 63/276,095, filed on Nov. 5, 2021.

(51) Int. Cl.
| | | |
|---|---|---|
| *C09K 8/592* | (2006.01) | |
| *E21B 47/12* | (2012.01) | |
| *E21B 49/08* | (2006.01) | |

(52) U.S. Cl.
CPC ............ *E21B 49/087* (2013.01); *C09K 8/592* (2013.01); *E21B 47/12* (2013.01); *E21B 2200/20* (2020.05)

(58) Field of Classification Search
CPC ...... E21B 43/16; E21B 43/166; E21B 43/168; E21B 43/164; E21B 43/24; E21B 43/2406; E21B 43/2408
See application file for complete search history.

(56) References Cited

U.S. PATENT DOCUMENTS

| | | |
|---|---|---|
| 4,344,485 A | 8/1982 | Butler |
| 5,215,146 A | 6/1993 | Sanchez |
| 6,662,872 B2 | 12/2003 | Gutek et al. |
| 9,567,842 B2 | 2/2017 | Wilfing et al. |
| 10,145,226 B2 | 12/2018 | Yee et al. |
| 10,584,568 B2 * | 3/2020 | Bahonar ............. E21B 43/2408 |
| 10,648,308 B2 | 5/2020 | Chen et al. |
| 11,370,958 B2 * | 6/2022 | Salazar Hernandez ...................... C09K 8/592 |

(Continued)

FOREIGN PATENT DOCUMENTS

| | | | |
|---|---|---|---|
| CA | 2912159 A1 | 3/2016 | |
| CA | 2956771 A1 | 8/2017 | |
| CA | 3079710 A1 * | 11/2020 | |

*Primary Examiner* — Angela M DiTrani Leff
(74) *Attorney, Agent, or Firm* — Boulware & Valoir PLLC (57) ABSTRACT

A method for producing heavy oil, the method including testing a plurality of samples either from a reservoir play or simulating a reservoir play in a temperature and pressure controlled gravity drainage experiment. Test injection fluids are injected into the samples at a reservoir temperature and pressure and Cumulative Oil Production (COP) or Recovery Factor (RF) or similar feature measured over time. An injection profile is obtained by selecting n injection fluids based on a best COP or RF at a given time $T_n$, wherein n is a number of fluid injection stages and switching to an n+1 injection fluid when a rate of change (ROC) in the COP or RF drops at least 25%-75%, but preferably 40-60% or 50%. The injection profile is then implemented in the reservoir to produce heavy oil. Optimized injection profiles for certain reservoirs are also provided.

20 Claims, 5 Drawing Sheets

(56) References Cited

U.S. PATENT DOCUMENTS

| | | | |
|---|---|---|---|
| 2005/0211434 A1* | 9/2005 | Gates | C09K 8/592 |
| | | | 166/272.3 |
| 2005/0252832 A1* | 11/2005 | Doyle | C10G 47/30 |
| | | | 208/434 |
| 2010/0276140 A1* | 11/2010 | Edmunds | E21B 43/2408 |
| | | | 166/272.3 |
| 2015/0083413 A1* | 3/2015 | Salazar | E21B 43/2406 |
| | | | 166/272.3 |
| 2019/0063199 A1* | 2/2019 | Doraiswamy | E21B 43/24 |

* cited by examiner

| YEARS | SAGD | C1_1 | C3_1 | C3_2 | C4_1 | C4_2 | C4_3 |
|---|---|---|---|---|---|---|---|
| 0 TO 2 | V* | | | | | V | V |
| 2 TO 4 | V | | V | | V* | | |
| 4 TO 6 | | | V | | V* | | |
| 6 TO 8 | | | V | | V* | | |
| 8 TO 10 | | | V | | V* | | |
| 10 TO 12 | | V* | | | | | |

SAGD - STEAM ASSISTED GRAVITY DRAINAGE
C1_1 - METHANE SUPERHEATED (OR COLD WHEN IMPLEMENTED)
C3_1 - PROPANE SATURATED
C3_2 - PROPANE SUPERHEATED      V - RECOMMENDED INJECTION
C4_1 - BUTANE SATURATED         V* - PREFERRED INJECTION
C4_2 - BUTANE SUPERHEATED
C4_3 - BUTANE SUPERCRITICAL

FIG. 6

OPTIMIZING STEAM AND SOLVENT INJECTION TIMING IN OIL PRODUCTION

PRIOR RELATED APPLICATIONS

This application claims priority under 35 U.S.C. § 119 to U.S. Ser. No. 63/276,095, filed Nov. 5, 2021, incorporated by reference in its entirety for all purposes.

FEDERALLY SPONSORED RESEARCH STATEMENT

Not applicable.

FIELD OF THE DISCLOSURE

The invention relates to petroleum production, in particular, methods for producing heavy oil and/or bitumen production with steam and solvent. More particularly, it relates to a method of deciding what fluids at which temperature and pressures are best used, and at what time and criteria the injected fluid should change in order to optimize production.

BACKGROUND OF THE DISCLOSURE

Production of heavy oil and bitumen from a subsurface reservoir can be quite challenging. The initial viscosity of the oil at reservoir temperature is often greater than five million centipoise (cP). Because of this high viscosity oil cannot be pumped out of the ground using typical methods, and it often must be mined from the surface or processed in situ to make it pumpable. Surface mining is limited to reservoirs to a depth of about 70 meters, and since only a relatively small percentage of bitumen and oil sand deposits (such as the Athabasca oils sands of Alberta, Canada) are recoverable through open-pit mining, the majority require some form of in situ extraction.

Figure 1A:
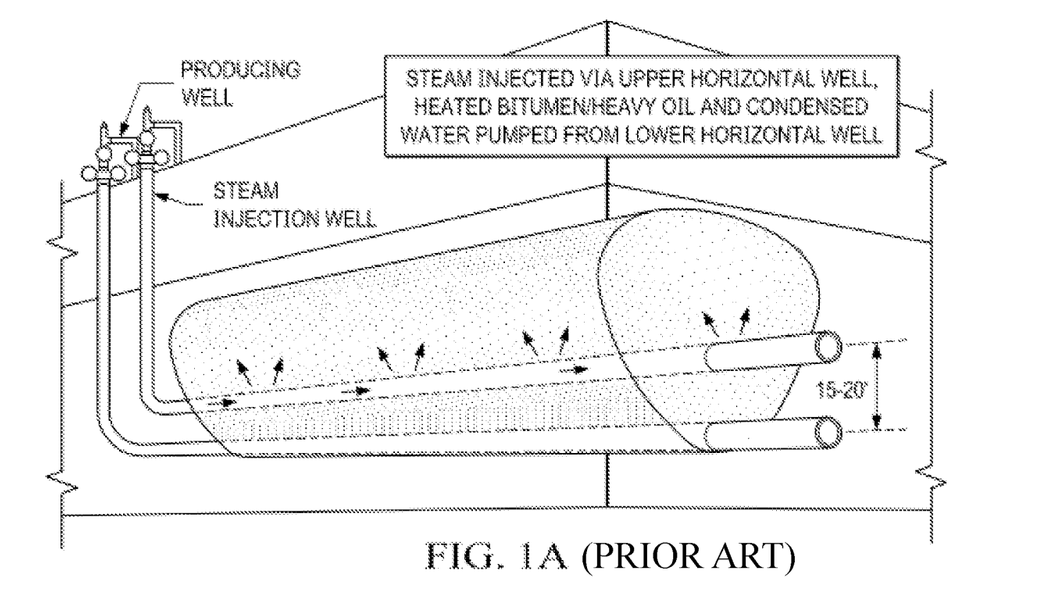
FIG. 1A depict a conventional steam-assisted gravity drainage in an oil sand formation.
Figure 1B:
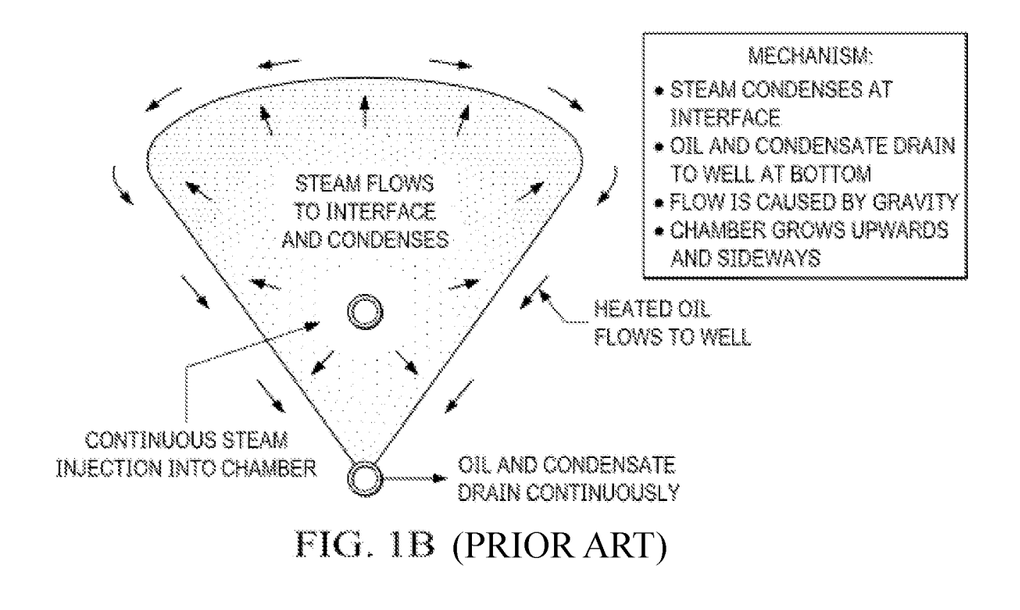
FIG. 1B shows the flow of steam heated oil.

Steam-assisted gravity drainage (SAGD) is an in situ method of thinning oil with steam heat that was first introduced by Roger Butler in 1973 as a means of producing heavy oil and bitumen and is widely used in Alberta (Canada), Russia, and China for recovery of heavy and extra-heavy oil sands resources. SAGD uses two parallel horizontal wells (see FIG. 1). The lower production well is located at the bottom of the pay, and the upper well is 4-5 meters above and parallel to it. First, steam is injected into both wells to conductively heat the petroleum deposit between the wells until the two wells are in fluid communication. This stage-known as start-up—can take on the order of 3-6 months in a typical Athabasca oil sands reservoir.

Once the wells are in fluid communication, the lower well is converted over to production, and the now mobile warmed petroleum can be gravity drained to the production well. During this SAGD process, steam is injected only into the top horizontal well (injection well) and oil with the condensed water are produced from the lower horizontal well (production well).

As an in situ recovery process, SAGD requires on-site steam generation and water treatment, translating into expensive surface facilities. Since water-to-oil ratios are high, significant amounts of water processing is required, resulting in high capital expenses. SAGD economics could also be impacted by high natural gas prices from the operating expense perspective. SAGD is very energy intensive largely because the reservoir rock and fluids must be heated enough to lower viscosity and mobilize the petroleum deposit, and heat is lost to overburden and underburden, water and gas intervals above, below, and within the main pay section, and to the non-productive rock in the reservoir. The high energy intensity results from the water vapor pressure conditions at high pressures such as 3000 kPa, which demands vapor steam injection at over 235° C.

On average, a third of the energy is produced back with fluids in the reservoir, a third is lost to overburden and underburden, and a third is left behind in the reservoir after abandonment. The inefficiency results in a steam-to-oil ratio (SOR) of 3.0 (vol/vol), and a 50-60% recovery factor of the original bitumen contacted by steam. To compound these inefficiencies, heavy oil and bitumen are sold at significant discounts compared to oil product benchmarks, such as West Texas Intermediate (WTI) (due to an additional dilution requirement in order to transport the otherwise viscous product), providing an exceedingly challenging economic environment.

Figure 2A:
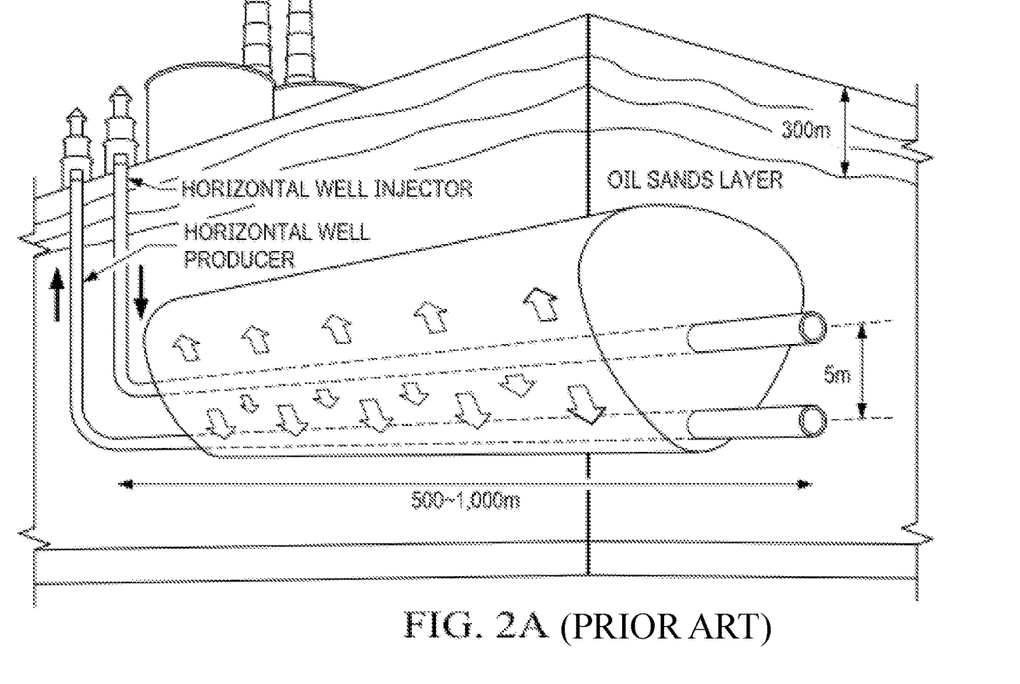
FIG. 2A depicts a VAPEX method where the well arrangement is essentially the same as in SAGD, but solvent instead of steam is used to mobilize oil.
Figure 2B:
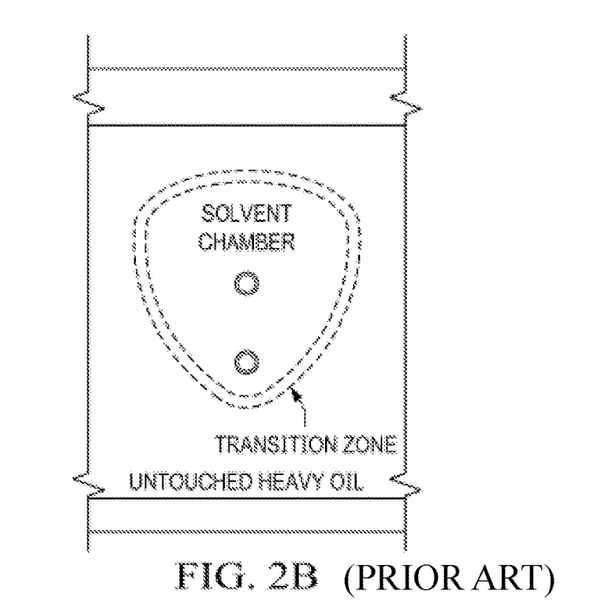
FIG. 2B shows the solvent chamber.

Vapor extraction (VAPEX) has been proposed as an alternative for heavy-oil recovery in reservoirs where thermal methods like SAGD and its variants face technical and economic problems. In VAPEX, a pair of horizontal injector-producer wells is employed, similar to that in SAGD (FIG. 2). Once the wells are in fluid communication, a gaseous hydrocarbon solvent (normally propane or a mixture of methane-propane or propane-butane) is injected from the top well and the diluted oil drains downward by gravity to the bottom producer.

Three variants of VAPEX have been proposed, namely: (1) conventional, (2) warm, and (3) hybrid. In conventional VAPEX, the effectiveness of the process relies solely on the mass transfer of solvent into the oil. In warm VAPEX, the solvent is heated before being injected into the reservoir and the faster reduction in viscosity of the oil causes an earlier establishment of the communication between the wells. In hybrid VAPEX, also called solvent assisted SAGD or SA-SAGD, both steam and solvent are co-injected, and the steam requirements are drastically reduced as compared to the conventional SAGD, and the solvent recovery is greater than that of conventional VAPEX.

The majority of VAPEX studies utilize propane as the injected solvent. Propane is less expensive than some of the other solvents and is able to provide satisfactory solubility into heavy oil. However, pure propane cannot be used as a solvent in VAPEX, in most cases as its vapor pressure is well below the heavy-oil reservoir pressure and if pure propane was injected, it would be in the liquid state and the process would be less effective. A vaporized solvent provides a greater gravity differential than a liquid, and the diffusion of a gas into oil will generally occur much faster than with a liquid solvent. In some cases, non-condensable gas (NCG) may be co-injected with propane to maintain bottomhole pressure (BHP) and equilibrate pressure across the reservoir.

The search for the ideal NCG to be added to the solvent is on-going. When a non-condensable gas such as methane is blended with propane, dew point pressures of the mixture increase significantly. The basic solvent mixtures usually consist of propane as a base blended with methane, ethane, butane, nitrogen, or $CO_2$. At first, many considered the addition of methane in various weights to a propane-based solvent. However, hydrocarbon gases such as methane and propane are expensive, and the feasibility of the VAPEX process depends largely on the solvent cost. In addition to the expense of the solvent, some solvent is inevitably lost, further contributing to difficult economics of heavy oil production using solvents.

Many researchers are therefore looking for ways to optimize steam and solvent production methods in order to produce heavy oils and bitumen as cost effectively and efficiently as possible, and the patent literature is replete with variations on the steam and solvent ideas. Variations include well arrangements, changing solvents or combinations thereof, changing solvent ratios, changing steam to solvent ratios, and the like.

In addition, some groups have experiments with the timing of the steam and solvent injections. For example, in U.S. Ser. No. 10/145,226, the criteria to invoke solvent injection post-SAGD is when the average temperature of producible adjacent oil of the reservoir outside of the steam chamber is such that the oil is mobile. In more detail, this patent calls for producing oil from SAGD well pairs using SAGD process until the average temperature of a producible adjacent volume of the reservoir outside the chamber reaches a value that permits reservoir oil to be mobilizable, then injecting solvent and i) co-injection of steam as required to maintain or increase reservoir temperature, and ii) co-injection of NCG as required to maintain or increase reservoir pressure. From the operational execution perspective, it could take many years of SAGD operation to meet the specified criteria for solvent injection, resulting in high energy intensity operation in the early years.

In CA2956771 steam is injected into the reservoir in a steam-dominant process until a threshold is reached, then solvent and steam are co-injected in a solvent-dominant process. The peak production threshold may be reached when the steam chamber has ceased substantial vertical growth or expansion (e.g., has reached the overburden above the steam chamber), when the oil production rate by the steam-dominant process has peaked, when the SOR or cumulative SOR (CSOR) has started to increase, or when the temperature in the interface region between the reservoir formation and the overburden has started to significantly increase.

In the U.S. Pat. No. 6,662,872 injection of steam continues until (i) the steam chamber has progressed vertically to a position that is approximately 25 percent to 75 percent the distance from the bottom of the injection well to the top of the reservoir, and (ii) the recovery rate of oil approximately 25 percent to 75 percent of the peak predicted recovery rate using SAGD, with the idea to create a "hot cavern" for solvent injection to maintain gaseous phase in-situ.

While each of these patents represents a step forward in optimizing steam and solvent based processes for recovering heavy oil, there is always room for improvement and earlier initiation of solvent injection, especially in highly heterogeneous reservoirs, and this disclosure presents such one such advance.

SUMMARY OF THE DISCLOSURE

The invention generally relates to methods to increase the efficiency and timing of steam and solvent injection in an in-situ oil recovery scheme. Bench top gravity drainage dynamic soak experiments led to the discovery that oil recovery is dependent not only on the solvent selected, but also on the cumulative oil produced (COP) or recovery factor (RF) and its Rate of Change (ROC) as a function of time when the solvent is injected and its relative pressure and temperature conditions.

The "gravity drainage dynamic soak test" is a bench top method of assessing what injection fluids will be best applied to a particular reservoir and evaluate oil production recovery schemes. High pressure vessels are equipped with injection means for injecting steam, solvent or NCG and test fluids and gases at controlled pressures and temperatures, and after soaking a core or sand sample with a given test fluid, the amount of oil produced from the sample by gravity drainage is measured over time.

From these plots, maximal production rate of oil at a given time point can be assessed, and together with cost information, an optimal fluid for use at a given stage can be selected. Switching injection components will occur when the stated ROC in a COP or RF substantially decreases to advance a less energy intensive scheme. Although the data generated in these bench top tests occurs in a greatly reduced timescale, realistic fluid-switching data can be obtained from oil production rates in real oil wells, and the change in injection fluids initiated at the selected point (e.g., when ROC in COP or RF decrease by 50% in an actual oilwell). The efficacy of each scheme as function of time could yield switching criteria to a different injection component.

In one specific example, the method is preceded by start-up (Phase 0) and any start-up method can be used to place a gravity drainage well-pair into fluid communication. Preferred methods include steam or steam-plus-solvent injections into both wells. Once the wells are in fluid communication, recovery is initiated (Phase 1) with SAGD or a SAGD variant or with a superheated or supercritical butane injection. Phase 2 commences when the ROC in COP or RF declines by at least 50%, and Phase 2 is injection of butane at saturation conditions. Phase 3 or wind down commences when ROC in COP or RF again declines by at least 50%, and a methane blow-down is used to improve the solvent recovery factor. Distinct from other solvent injection timing proposals, using the ROC method allows the particular reservoir heterogeneity to dictate the timing for invoking solvent injection on customized basis by observing the change in ROC in COP or RF, yielding a more environmentally friendly recovery scheme and more appropriate utilization of the high energy intensity steam injection. This particular injection profile was designed using the gravity injection dynamic soak test and the various selection criteria discussed herein, and that method can be applied to any heavy oil reservoir and an optimized injection plan prepared and then implemented to produce oil or gas.

Gravity drainage dynamic soak tests were conducted herein to evaluate the relative performance of light hydrocarbon injection on oil production relative to SAGD and NCG (methane) injection. The setup was uniquely designed using a mesh model of the reservoir and high temperature and pressure sleeve system (see FIG. 3), allowing us to imbibe and saturate the model with the given test fluid, then gravity drain it for the dynamic soak test.

This setup allowed the injection of solvent to the system under various pressure and temperature conditions and thereby screen their relative performance on the oil recovery rates. Pressure was fixed at 3000 kPa for all tests in this proof-of-concept work, except the supercritical butane test, which was conducted at roughly 4000 kPa. The temperature was customized according to the specific experiment vapor pressure conditions, and the details are provided below. The experimental setup was equipped with flow control valves to maintain proper pressures, heaters to vaporize the injected components to the required saturation conditions, thermocouples to monitor the temperature in the model, pressure transducers and wet test meter to close the material balance. This experimental configuration allowed us to control the injection conditions to mimic the in-situ reservoir conditions.

Figure 4:
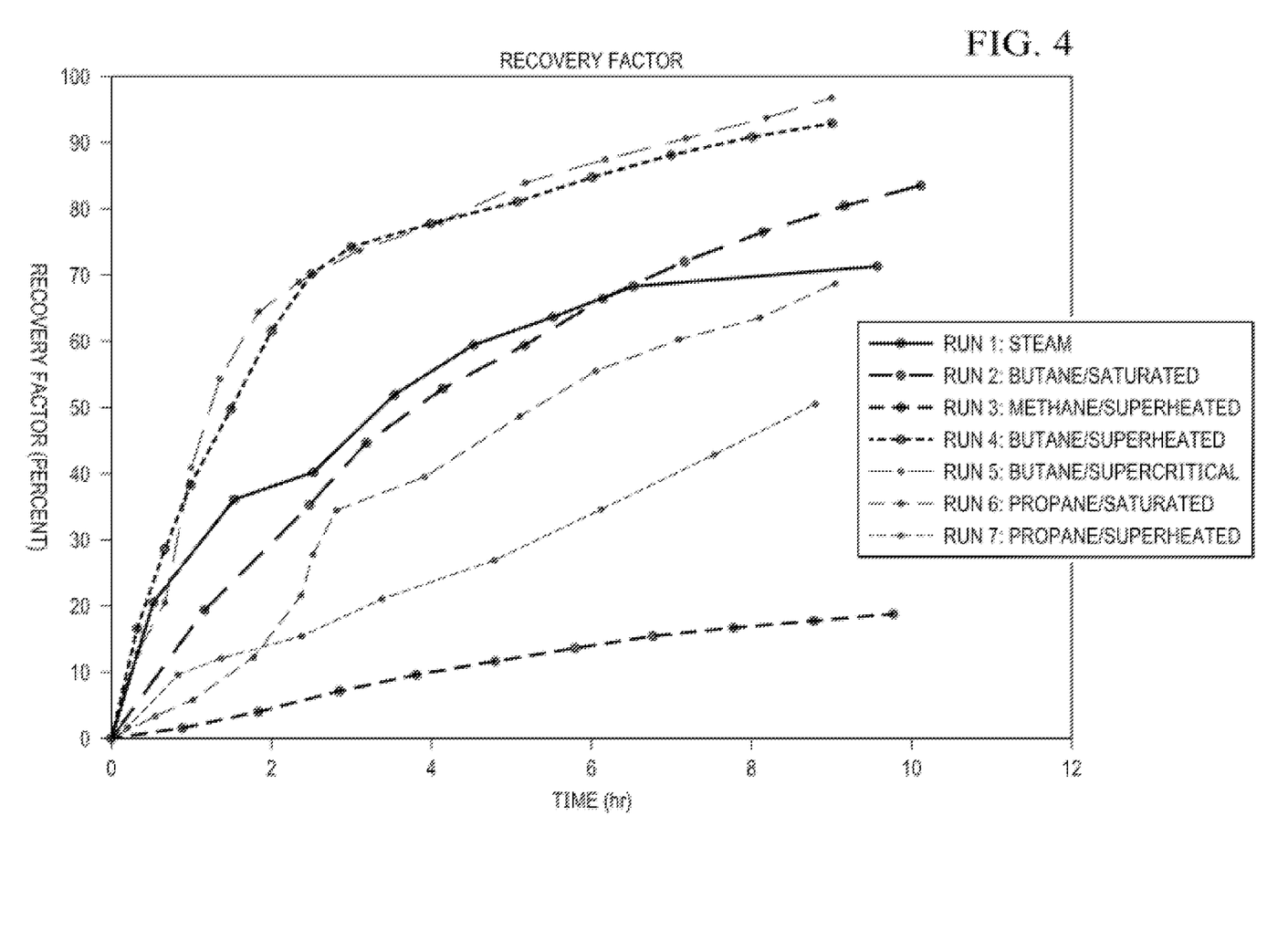
FIG. 4 shows the recovery factor versus time for several injection profiles in a simulated reservoir mesh model.

The performance in ROC for oil RF as function of time varied for the various solvents injected and their separate pressure and temperature conditions is illustrated in FIG. 4. The number of hours in the experiments was assumed to be correlative to the number of years during the actual resource recovery in the field as a rough estimate for this proof-of-concept work, but the actual time period will vary according to the reservoir and production conditions. Furthermore, the predictions can be confirmed by simulations using e.g., CMG-STARS, as well as by observing production rates in actual production from wells in similar conditions.

As mentioned, the order for invoking various injection streams and the injection conditions are strategized by utilizing the estimated ROC in COP or RF (slope), correlated to the oil production rate, obtained from lab tests results as seen in FIG. 4. A significant real time slope change (ROC) in oil RF or COP indicates the need to switch to a solvent injection scheme. The criteria for invoking butane injection is that the slope of oil RF or COP during SAGD declines by over 35%, 40%, 45%, 50%, 55%, 60%, 65%, 70%, 75% or more, as will be determined in future simulation runs. For this proof-of-concept work, we have chosen a 50% cutoff, but cutoffs may vary depending on 1) the price of crude oil, 2) the price of the solvent in question, and 3) the level of solvent recovery and reuse.

For example, at 2.5 years (assuming an hour is a year) the recovery factor was 40% for SAGD and 35% for butane injected at saturation conditions. For the butane case the recovery factor after 7 years is about 71%, but the same recovery factor was achieved via SAGD after 9.5 years. Thus, invoking butane injection could accelerate this amount of oil production by 2.5 years.

In more detail, the SAGD ROC in slope calculated from FIG. 4 for the initial time frame (0.5-1.5 hrs) was (36.18-20.49)/(1.53-0.53)=15.7. During the next stage (1.5-2.5 hrs) was (40.25-36.18)/(2.53-1.53)=4.1. Thus, a decrease of roughly 74% in ROC was observed in the oil recovery factor slope over time between the two recorded timeframes. In our experiments, this decay started taking place around the 1.5 to 2 hours mark, so at this point butane at saturation conditions injection should have been implemented to improve performance by reducing steam injection and increasing solvent injection (preferably butane at saturation conditions).

Based on these preliminary results, an ideal method for these particular oil sand samples might include the following phases (see also FIG. 5):

Phase 0) is a start-up phase that precedes the inventive method and occurs until the wells in a well-pair are in fluid communication. Once achieved, phase 1 is initiated. In some reservoirs, the start-up phase may have occurred in the past, which is why it is not necessarily the first step. In addition, there are variant SAGD-like processes that reduce or omit start-up. See e.g., U.S. Pat. Nos. 5,215,146, 9,567,842.

Phase 1) initiation of oil production by either superheated butane, supercritical butane, or SAGD. In this reservoir, the preferred method is the use of SAGD until ROC in COP or RF decreases by 50%, which will invoke Phase 2) to improve SOR and reduce greenhouse gases (GHG) emissions. The second most preferred injection is superheated butane (C4), which is more cost effective than supercritical C4 and provides similar results. The assumption here is that to achieve the 4000 kPa required for supercritical conditions, more solvent should be injected.

Once the ROC decreases by e.g., 50%, phase 2 commences. Phase 2) is injection of butane (C4) or propane (C3) or a combination thereof at saturation conditions until ROC in COP or RF decreases by 50%, then initiate phase 3.

Once the ROC decreases by e.g., 50%, phase 3 commences. Phase 3) In wind-down, a methane (C1) blow down is initiated to maintain the bottomhole pressure (BHP) in the reservoir, reduce solvent injection requirement and improve the solvent recovery factor. Further reduction in steam to oil ratio (SOR) and solvent to oil ratio could be realized. Pressure tapering strategies and methods as specified in U.S. Ser. No. 10/648,308 could be integrated for a more efficient operation.

The operator may co-inject steam at any phase, and/or may co-inject an NCG. This may be appropriate to maintain BHP or increase the temperature in the reservoir to ensure supercritical, superheated and saturation conditions for solvents are met.

The above example is exemplary only, and every reservoir may react differently to different injection fluids because they have a different oil profile, different porosity, different rock characteristics, etc. However, the general methodology may be applied to other oil sands or core samples and optimal injection profiles obtained thereby.

The invention includes any one or more of the following embodiment(s) in any combination(s) thereof.

A method for producing heavy oil, said method comprising: a) testing a plurality of samples from or simulating a reservoir play in a temperature and pressure controlled gravity drainage experiment, wherein test injection fluids are injected into said samples (one at a time) at a reservoir temperature and pressure (RTP) and measuring oil production rate and cumulative oil production (COP) or recovery factor (RF) over time; b) selecting n injection fluids based on a best production rate or COP or RF at a given time $T_n$, wherein n is a number of fluid injection stages and switching to a n+1 injection fluid when a rate of change (ROC) in said COP or RF drops by a selected percentage, thereby generating an injection fluid profile comprising a first injection fluid steam or mixture thereof for $T_1$, a second injection fluid for $T_2$, up to an nth injection fluid for $T_n$. Now that we have an optimized injection profile, a well-pair in fluid communication in a heavy oil reservoir is produced using that injection profile. Switching occurs when actual reservoir production drops by the selected percentage, otherwise, the temperature and pressure conditions should mirror the tested selected conditions. NCG may be added as needed to maintain pressure.

A method for producing heavy oil, said method comprising: a) testing a plurality of samples from or simulating a reservoir play in a temperature and pressure controlled gravity drainage experiment of a plurality of test injection fluids, wherein a test injection fluid is injected into a sample (times n samples and n test fluids) at a reservoir temperature and pressure (RTP) and an oil production rate is measured over time; b) selecting n injection fluids based on a smallest ROC in COP or RF or best bbl/day for the best performing COP recovery scheme at a given time $T_n$, wherein n is a number of fluid injection stages and switching to an n+1 injection fluid when a test ROC in COP or RF drops at least 50%, thereby generating an injection fluid profile comprising a first injection fluid for $T_1$, a second injection fluid for $T_2$, up to an nth injection fluid for $T_n$; c) providing a well-pair in fluid communication in a heavy oil reservoir, said well-pair comprising a horizontal injection well above and parallel to a horizontal production well; d) injecting said first selected injection fluid into said injection well at $T_1$ and producing heavy oil from said production well; e) switching to injecting said second injection fluid into said injection well at $T_2$ when an actual ROC in COP or RF drops at least 40% from an initial rate at a beginning of a particular injection step, and producing heavy oil from said production well. This switching step is repeated as needed to reach $T_1$ and injecting said nth injection fluid and producing heavy oil from said production well.

Any method herein described, wherein said switching step occurs when said drop is at least 30%, 40%, 50%, 60%, or 70%, or any number therebetween.

Any method herein described, wherein said ROC from $T_n$ to $T_{n+1}$ is $(COP_{n+1}-COP_n)/(T_{n+1}-T_n)$ or $(RF_2-RF_1)/(T_2-T_1)$.

Any method herein described, wherein said injection fluids are selected from steam, C1-4 hydrocarbons, NCGs and combinations thereof.

Any method herein described, wherein said injection fluid profile comprises: injecting either i) steam into said injection well or ii) butane at supercritical or superheated conditions; producing heavy oil from said production well until a ROC in COP or RF drops at least 30-70%; switching to injecting a hydrocarbon solvent into said injection well when said ROC drops at least 30-70%, said hydrocarbon solvent comprising butane or propane at saturation conditions; producing heavy oil until wind down; and injecting methane into said injection well and producing heavy oil and said hydrocarbon solvent from said production well.

Any method herein described, wherein said injection fluid profile comprises: injecting steam into said injection well; producing heavy oil from said production well until ROC drops at least 30-70%; switching to injecting a hydrocarbon solvent into said injection well when said ROC drops at least 30-70%, said hydrocarbon solvent comprising butane at saturation conditions; producing heavy oil until wind down; and injecting methane into said injection well and producing heavy oil and said hydrocarbon solvent from said production well.

Any method herein described, wherein said first injection well is disposed 5 meters above said production well and/or wherein said injection wells and said production well are vertically aligned and parallel with each other. Alternatively, the wells may be laterally offset, i.e., not directly over one another. Any other gravity drainage arrangement of wells can be used instead.

Any method herein described, wherein said switching step occurs twice, or a plurality of times.

Any method herein described, wherein said drop happens due to a geological heterogeneity and/or due to low pressure injection operational strategy.

As used herein, "Rate of Change" is defined herein is the change in oil recovery factor (RF) over time (T) such that $ROC=(RF_2-RF_1)/(T_2-T_1)$. One could also use cumulative oil production (COP) in lieu of RF. In this case, $ROC=(COP_2-COP_1)/(T_2-T_1)$. It may also be possible to use daily production oil rate (bbl/day) and its relative decay rate over time due to geological heterogeneities. Whichever system is used, one should use the same measurement in all benchtop gravity drainage experiments, and then use a comparable system in the actual reservoir. The time periods will of course vary significantly given the orders of magnitude difference in size—benchtop experiments occurring in hours and actual production periods lasting months or years.

The "drop" in ROC is assessed as compared to an initial value in a given stage. By an "initial" production rate, we mean that the operator should review the data and select that rate that best conforms to a production rate at a beginning of a relevant injection stage. If there is a delay in production for some reason, then the best rate in a stage should be used. However, usually production is best at the beginning.

By "testing or simulating" a plurality of samples, we mean one of three things. First, one can test actual core or sand samples obtained from the reservoir. Second, one may create core or sand samples as described herein that mimic the reservoir samples, e.g., have the same oil, same porosity, same type of rock, same PVT, etc. Third, one can wholly simulate samples that mimic the reservoir samples in a reservoir model, such as CMG's® STARS or GEM, TERAD-G, TOUGH2, PARADIGM's® SKUA-GOCAD, SCHLUMBERGER's® INTERSECT or ECLIPSE, HALLIBURTON's® QUIKLOOK®, LANDMARK@ NEXUS®, DYNAMIC GRAPHICS®'s COVIZ4D®, ROCK FLOW DYNAMICS@ tNAVIGATOR, BOAST™ BLACK OIL APPLIED SIMULATION TOOL, MRST™ MATLAB RESERVOIR SIMULATION TOOLBOX, OPEN POROUS MEDIA (OPM), MACHINE LEARNING, DATA PHYSICS, and the like. Combinations thereof are also possible.

A "test" production rate prefers to the data generated in the experimental or simulated set up. An "actual" production rate refers to the oil being produced from the reservoir.

"Recovery factor" or RF is the percentage of total oil produced and is plotted against time. Total oil in a simulated sample is usually known, and can be estimated in a core sample or in a reservoir, but switching to COP allows measurement of oil produced over time and the associated decay in the cumulative production which is represented by ROC in COP.

"Cumulative oil produced" or "COP" is the total number of barrels produced and is plotted against time.

"Bbl/day" is the number of barrels produced per day.

"Heavy oil" as used herein is intended to include heavy, extra heavy and bitumen hydrocarbons.

"Formation" or "reservoir" as used herein refers to a geological structure, that includes one or more hydrocarbon-containing layers, possibly one or more non-hydrocarbon layers, an overburden and/or an underburden. The hydrocarbon layers can contain non-hydrocarbon material as well as hydrocarbon material. The overburden and underburden can contain one or more different types of impermeable materials, for example rock, shale, mudstone wet carbonate, or tight carbonate.

"Petroleum deposit" or "play" refers to an assemblage of hydrocarbons in a geological formation. The petroleum deposit can comprise light and heavy crude oils, natural gas, and bitumen. Of particular interest for the method described herein are petroleum deposits that are primarily heavy oil and bitumen.

"Injection well" or "injector" refers to a well that is fitted for injection, and allows fluid injection into a geological formation. In a producing well-pair, it is typically 4-5 meters over a production well in a play, but may be closer in a thin play or in certain specialized well arrangements.

"Production well" or "producer" refers to a well that is fitted for production and is in and close to the bottom of a play and from which a produced fluid, such as heated heavy oil, is recovered from a geological formation. In SAGD and other gravity drainage processes, the well may be initially fitted for injection, then refitted for production once start-up is complete.

An "infill well" is a well low in the play situated between a conventional horizontal well-pair, and serves to catch oil trapped between the teardrop shaped steam/vapor chambers.

Although we discuss a horizontal well-pair herein, it is understood that there may be an array of well-pairs covering a play, with or without infill wells, and that wells may also have multilateral wells branching off a mother well, or infill wells, as needed to effectively drain a play.

A "multilateral well" refers to a well, which is one of a plurality of horizontal branches, or "laterals", from a mother wellbore. These branch off an existing well, called the "mother" well, and do not reach the surface or have their own well pad.

"Start-up" refers to the process of putting two wells in a gravity-drainage well-pair into fluid communication and is a distinctive phase in a well-pair's lifespan. This is frequently done by injecting steam into both wells, but other methods are possible, including electric, RF or EM heating of wells, solvent-assisted start-up, dilation start-up, combustion-based methods, and the like.

"Wind-down" is another distinct phase in a well's producing life wherein production is slowed, and measures are taken, for example, to recover solvent from the reservoir. Wind-down is initiated when oil production is no longer economical, and thus may vary depending on oil prices. However, wind-down is typically initiated when the oil recovery factor reaches a specified threshold or if there SOR increases to high levels where steam could be redeployed elsewhere to operate at lower SOR conditions. When wind-down is complete, the well is shut-in, though it may be opened again when new technology is developed or when the price of crude oil increases.

"Steam-assisted gravity drainage" or "SAGD" refers to an in situ recovery method which uses steam and gravity drainage to produce oil from a traditional parallel horizontal well-pair with about 4-5 meters vertical separation, and generally as described by Butler in U.S. Pat. No. 4,344,485. Such a well-pair may be called a "gravity drainage well-pair," and there are variations on the arrangement of such well-pairs beyond the traditional SAGD well-pair, any of which may be used in the invention.

"SAGD variants" includes all SAGD related or modified processes such as steam-assisted gravity push (SAGP), single-well SAGD, solvent-assisted SAGD, varying well placement methods, and the like, as well as the original SAGD method, so long as both steam heating and gravity drainage are employed as the dominant driver of production. The methods used herein can be applied to any SAGD variant.

"Non-condensable gases" or "NCGs" are gases from chemical or petroleum processing units (such as distillation columns or steam ejectors) that are not easily condensed by cooling. Examples of suitable NCGs for solvent assisted recovery processes include, but are not limited to, carbon dioxide ($CO_2$), nitrogen ($N_2$), carbon monoxide (CO), methane, and flue gas.

"Flue gas" or "combustion gas" refers to an exhaust gas from a combustion process that exits to the atmosphere via a pipe or channel. Flue gas typically comprises nitrogen, $CO_2$, water vapor, oxygen, CO, nitrogen oxides (NOx) and sulfur oxides ($SO_x$). The combustion gases can be obtained by direct steam generation (DSG), reducing the steam-oil ratio and improving economic recovery.

"Hydrocarbon solvent" or "solvent" refers to a chemical consisting of carbon and hydrogen atoms which is added to another substance to increase its fluidity and/or decrease viscosity. A hydrocarbon solvent, for example, can be added to a fossil fuel deposit, such as a heavy oil deposit or bitumen, to partially or completely dissolve the material, thereby lowering its viscosity and allowing recovery. The hydrocarbon solvent can have, for example, 1 to 8 carbon atoms ($C_1$-$C_8$), 1-4 carbons ($C_1$-$C_4$), or preferably 1-2 ($C_1$-$C_2$) or 3-4 carbons ($C_3$-$C_4$) herein.

"Steam to oil ratio" or "SOR" is refers to the ratio of injected steam (expressed as cold water equivalent or CWE) to petroleum production volume. A SOR of three means that three barrels or water (in the form of steam) were required to produce each barrel of oil.

"Cumulative steam-oil ratio" or "CSOR" refers to the ratio of cumulative injected steam (expressed as cold water equivalent or CWE) to cumulative petroleum production volume. The thermal efficiency of SAGD is reflected in the CSOR. Typically, a process is considered thermally efficient if its SOR is less than 3, such as 2 or lower. A CSOR of 3.0 to 3.5 is usually the economic limit, but this limit may vary project to project and depending on oil prices.

"Steam chamber", "vapor chamber" or "steam vapor chamber" refers to the pocket or chamber of gas and vapor formed in a geological formation by a SAGD, SA-SAGD, SAGP, VAPEX-like and variant processes.

"Production" refers to extraction of petroleum from a petroleum deposit or hydrocarbon-containing layer within a geologic formation.

As used herein, "superheated" means to heat a liquid beyond its normal boiling point under pressure. For example, superheated butane was heated to 240° C. and injected at 3000 kPa in our experiments.

As used herein, "supercritical fluid" or "SCF" means any substance at a temperature and pressure above its critical point, where distinct liquid and gas phases do not exist, but below the pressure required to compress it into a solid. Supercritical fluids can be regarded as "hybrid solvents" with properties between those of gases and liquids, i.e., a solvent with a low viscosity, high diffusion rates and no surface tension. The most common SCFs are supercritical carbon dioxide ($CO_2$) and supercritical water.

Figure 6:
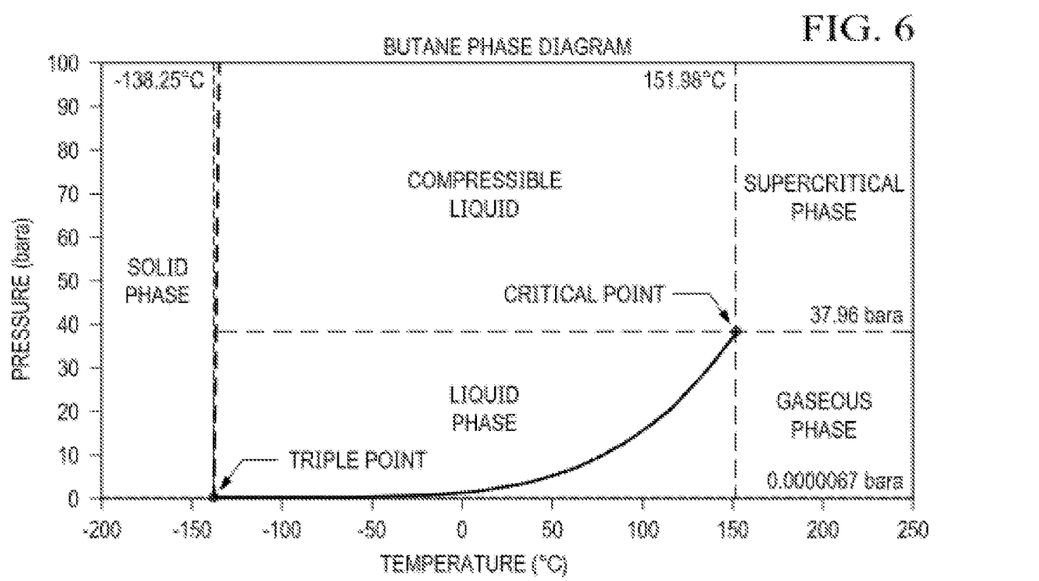
FIG. 6 shows the phase diagrams for butane.

Butane is a gas at standard conditions, but the butane phase diagram at FIG. 6 shows the phase behavior with changes in temperature and pressure. The curve between the critical point and the triple point shows the butane boiling point with changes in pressure. As an example, a mixture containing 75 wt % propane and 25 wt % butane has been used as a supercritical extracting agent for heavy oil. Extraction processes have been carried out in a temperature range of 80-140° C. and pressure range of 5-10 MPa. Herein the SCF butane was at 160° C. and injected at 4000 kPa.

A "dense phase fluid," as defined herein, is a non-gaseous fluid. Such dense phase fluids include liquids and supercritical fluids (SCFs).

The use of the word "a" or "an" when used in conjunction with the term "comprising" in the claims or the specification means one or more than one, unless the context dictates otherwise. The use of the term "or" in the claims is used to mean "and/or" unless explicitly indicated to refer to alternatives only or if the alternatives are mutually exclusive.

The term "about" means the stated value plus or minus the margin of error of measurement or plus or minus 10% if no method of measurement is indicated.

The terms "comprise", "have", "include" and "contain" (and their variants) are open-ended linking verbs and allow the addition of other elements when used in a claim. The phrase "consisting of" is closed, and excludes all additional elements. The phrase "consisting essentially of" excludes additional material elements, but allows the inclusions of non-material elements that do not substantially change the nature of the invention, such as varying well arrangements, varying completion parameters, inclusion of additives in the injection fluids, and the like. Any claim or claim element introduced with the open transition term "comprising," may also be narrowed to use the phrases "consisting essentially of" or "consisting of," and vice versa. However, the entirety of claim language is not repeated verbatim in the interest of brevity herein.

The following abbreviations are used herein:

| | |
|---|---|
| bbl/day | Nillion barrels/day |
| BHP | Bottomhole pressure |
| COP | Cumulative oil production |
| cP | Centipoise |
| CSI | Cyclic solvent injection, like CSS but with a solvent instead of steam. |
| CSOR | Cumulative SOR. |
| CSS | Cyclic steam stimulation-CSS or cyclic steam injection (CSI) is the alternating injection of steam and production of oil with condensed steam from the same well. The process is a mature process for deep, thicker resources, and involves cycling high-pressure steam injected through the target zone for several weeks to reduce the oil viscosity; then, in the next step, a soaking period is given to the steam to diffuse through the reservoir. Finally, oil is produced from the same well. It is sometimes referred to as huff and puff. |
| CWE | cold water equivalent |
| DSG | Direct steam generation |
| GHG | Greenhouse Gases |
| GOR | Gas-oil ratio |
| MPa | Megapascals |
| NCG | Non condensable gas, e.g., $CO_2$, $CH_4$ |
| RF | Recovery factor, percentage of oil recovered. |
| ROC | Rate of change |
| RTP | Reservoir Temperature and Pressure |
| SAGD | Steam-assisted gravity drainage |
| SAGP | Steam assisted gravity push-SAGP is a thermal oil recovery process that is similar to SAGD but which involves the addition of a small concentration of a non-condensable gas to the steam. |
| SA-SAGD | Solvent Assisted SAGD |
| SCF | Supercritical Fluid |
| SOR | steam-to-oil ratio |
| SW-SAGD | Single well SAGD |
| SW-XSAGD | Single well cross SAGD |
| VAPEX | Vapor Extraction |
| WTI | West Texas Intermediate |
| XSAGD | Cross well SAGD |

Data is available that shows the relative costs for various injection fluids. The general trend is that the smaller the hydrocarbon, the less expensive it is. Data like this along with solvent recovery data and oil prices can be used to select the optimal cutoff point for switching injection fluids.

DESCRIPTION OF EMBODIMENTS OF THE INVENTION

The present invention is exemplified with respect to oil sands from the McMurray Formation in Alberta, Canada. The McMurray Formation hosts bitumen-bearing sands across the Surmont lease. It is a succession of fluvial-estuarine channel deposits filling a broad, north-trending, valley system entrenched in the exposed landscape of a carbonate Devonian trend.

The McMurray is divided informally into lower, middle, and upper units. The lower McMurray is interpreted as fluvial and various other nonmarine deposits. The majority of the bitumen-saturated sands occur in the middle unit, which is characterized by largescale sets of inclined strata that are interpreted as inclined heterolithic stratification. The bitumen-saturated sands are sporadically underlain by water, and overlain by water and gas sands of the McMurray's upper unit. The upper unit generally reflects increasing marine influence. Bitumen saturation decreases at the eastern edge of the lease, where a majority of the McMurray sands become wet. The middle unit of the McMurray is the main bitumen reservoir and SAGD target. The SAGD interval consists mainly of fine to very fine sands, sandy inclined heterolithic stratification, and mudstone breccias. These deposits are interpreted to be part of large fluvio-estuarine channel complexes.

However, this reservoir is exemplary only, and the invention can be broadly applied to any fossil fuel deposit, provided gravity-based oil recovery tests or simulations are performed to select appropriate timing and solvents for a particular reservoir type. Furthermore, the method can be combined with other common processes, such as hydraulic fracturing, and the like. The following examples are intended to be illustrative only, and not unduly limit the scope of the appended claims.

EXPERIMENTAL SETUP

Figure 3:
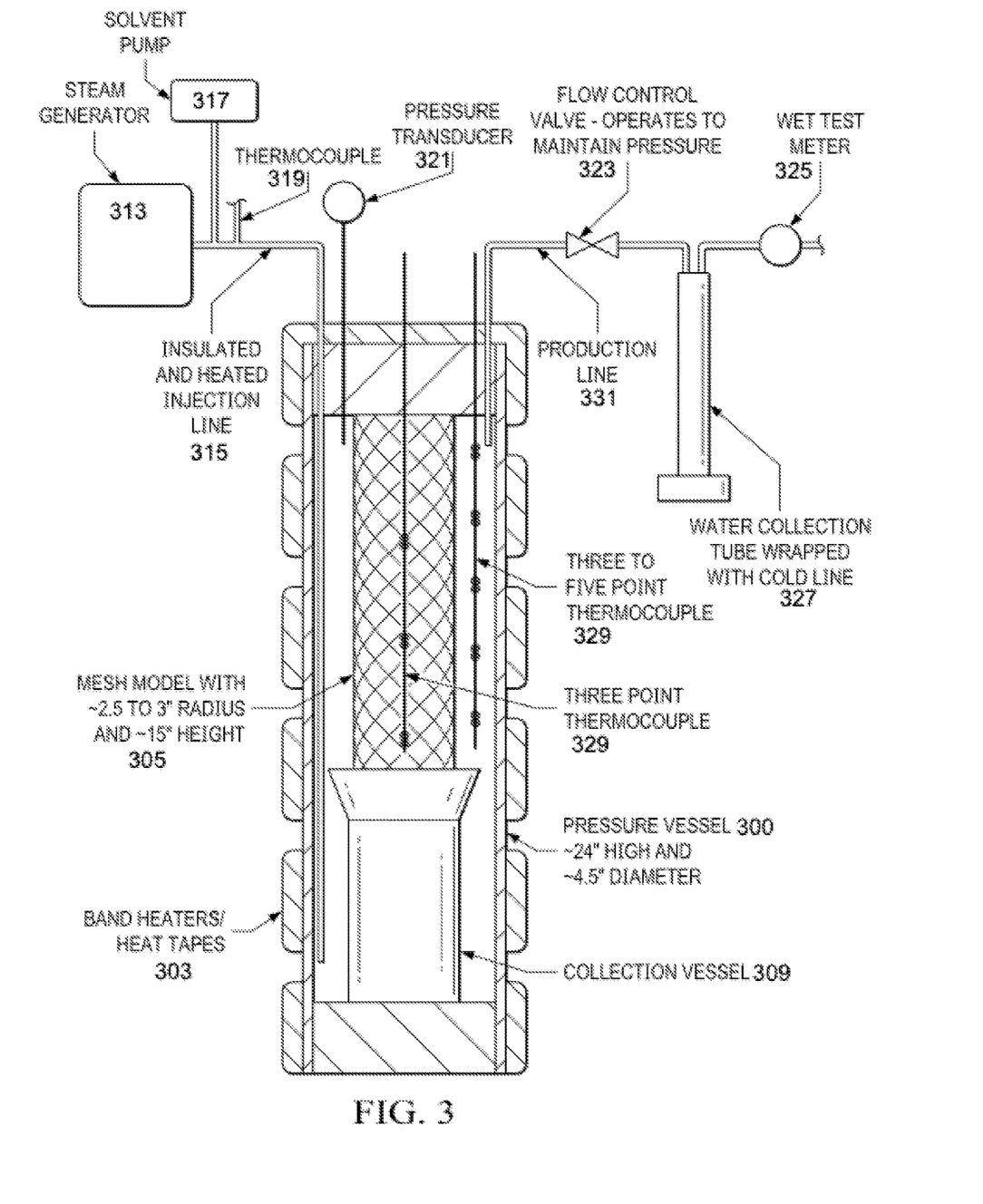
FIG. 3 shows a mesh model and sleeve setup for assessing oil recoveries in a benchtop experiment. The mesh model is a screened cylinder packed with sand and oil and designed to imitate the reservoir in question, but a real core or sand sample could also be used in a similar setup.

FIG. 3 shows the experimental setup for testing a gravity drainage system dynamic soak under controlled pressure and temperature conditions. A high pressure vessel 300 is surrounded with band heaters or heat tapes 303 to maintain the desired temperature, for the specific operating conditions.

Inside the vessel 300 is a mesh model 305 of approximately 2.5-3 inches radius and 15 inches in height. The mesh model 305 is a sand packed screened cartridge that is packed at the same density and same materials as found in the reservoir. Thus, it is packed with sand or a core sample, loaded with heavy oil, then used as the test sample for the following methods. Real core or sand samples could also be used provided they are loaded with oil.

Herein, porosity was roughly 30% and permeability at 6 Darcy. The initial oil saturation was at roughly 90% and water saturation was roughly 10%. The objective was to prepare all models in a similar way, with similar parameters to verify best performing recovery scheme based on the injected component and the associated oil drainage. Each mesh model was then tested with a different injection fluid under stated conditions. The observations from the mesh model tests were also verified via a larger 3D physical model for the SAGD, butane only and butane/propane mixture case.

For steam and superheated butane injection, the operating conditions were 3000 kPa in pressure and about 235° C. in temperature. In all cases, 3000 kPa was the injection pressure except the butane supercritical case where injection pressure was close to 4000 kPa. In the methane and butane cases, the components were injected at butane saturation conditions at just over 150° C.

When the desired vessel conditions were achieved, injection of each of the component was initiated via the flow control valve at 3000 kPa. Below the mesh model 305 of the reservoir, sits a high pressure collection vessel 309, of about 4.5 inches diameter and about 24 inches in height. Oil that is produced from the sample will gravity drain down into this vessel. Steam generator 313 provides steam to the system through an insulated and heated injection line 315. Solvent reservoir and pump 317 provides solvent, also via line 315 and another thermocouple 319 senses and controls heat of the injected fluids. Other parts used in controlling fluid flow, temperature, pressure, and the like, include pressure transducer 321, valve 323, wet test meter 325, water collection tube 327, thermocouples 329, and production line 331.

Reservoir simulations were also initiated to design the experiment and forecast observations. History match via reservoir simulations was conducted to confirm the results. The same saturation conditions, flow rates and other reservoir properties were used in the reservoir simulation work as were used in the benchtop experimental work.

The data generated by the mesh model system is shown in FIG. 4, where it is immediately apparent that superheated butane, supercritical butane and steam produce oil at the fastest rates on the 0-2 hour range. Thus, any of these three may be used for initial production from a well once fluid communication is achieved. However, it is generally true that the cost of a hydrocarbon solvent increases with carbon number, thus steam per traditional SAGD may be preferred as more cost effective than solvents, yet still allowing a good production rate. Further, with respect to superheated versus supercritical butane, superheated will be more cost effective, and thus would be a good second choice. The slope of the SAGD line begins to drop, however, at 1 hour, suggesting that switching to the more expensive solvent will be worth implementing at some time point when the production rate begins to fall.

The exact switching point will depend on the costs of the solvent as well as the relative production rate, but herein we have selected ROC of 50% as a good time at which to switch injection fluids. It may, however, vary as much as from 25% to 75%, or 30-70% but probably stay in the 40-60% range.

Additionally, solvent to oil ratio of 0.4 could be used a criteria to represent solvent injection requirement and the associated oil production. Once the solvent to oil ratio exceeds 0.4, then steam or NCG or a combination thereof should be invoked as the solvent injection rate is reduced. As above, the exact cutoff chosen will vary with costs and may range from 0.2-0.6, or 0.3-0.5, but 0.4 was selected herein.

Figure 5:
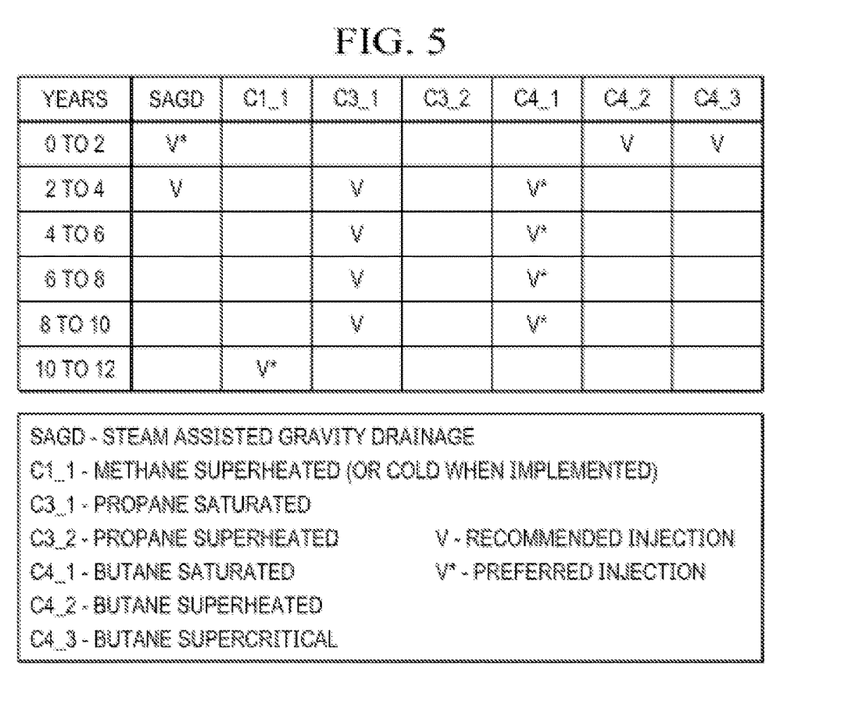
FIG. 5 shows a chart of preferred methodology given the data provided in FIG. 3. This injection profile is exemplary only and will vary depending on the reservoir and the results of the testing.

Using these principles, the chart at FIG. 5 was produced, and we can see the best (V*) as well as suitable (V) injection fluids for the indicated time points. Further, although our experiment occurs in hours, and oil production over the course of years, when the injection method is actually implemented downhole, the bbl/day will be tracked, and a 50% drop in ROC in COP or RF will be directly apparent, and the changeover can be initiated at that time point.

This data was generated with samples emulating a particular reservoir, and different reservoirs are expected to behave differently. Thus, the above experiments can be repeated with core or sand samples from a reservoir of interest and proposed injection fluids assayed in the same way, perhaps including C1, C2, C3, C4 and C5 solvents, with and without proposed NCG added thereto, at varying temperatures and pressures, and perhaps also with varying amounts of steam co-injection. Using the data generated thereby, and the principles articulated herein, an injection profile can be selected for each reservoir to optimize oil production rates and cost effectiveness. The optimized injection profile is then implemented in the reservoir to produce hydrocarbons in the most cost-effective manner.

The following references are incorporated by reference in their entirety:

Khairutdinov, V. F., et al, Supercritical fluid propane-butane extraction treatment of oil-bearing sands, Theoretical Foundations of Chemical Engineering 51: 299-306 (2017)

U.S. Ser. No. 10/145,226 Steam-solvent-gas process with additional horizontal production wells to enhance heavy oil/bitumen recovery CA2956771 Methods of recovering heavy hydrocarbons by hybrid steam-solvent processes U.S. Pat. No. 6,662,872 Combined steam and vapor extraction process (SAVEX) for in situ bitumen and heavy oil production U.S. Pat. No. 5,215,146 Method for reducing startup time during a steam assisted gravity drainage process in parallel horizontal wells U.S. Pat. No. 9,567,842 Radial fishbone SAGD U.S. Ser. No. 10/648,308 Solvents and NCG-co-injection with tapered pressure U.S. Pat. No. 4,344,485 Method for continuously producing viscous hydrocarbons by gravity drainage while injecting heated fluids

The invention claimed is:

1. A method for producing heavy oil, said method comprising:
   a) testing or simulating a plurality of samples from a reservoir in a temperature and pressure controlled gravity drainage experiment of a plurality of test injection fluids, by injecting a test injection fluid into a sample at a reservoir temperature and pressure (RTP) and measuring a test oil production rate and a test Rate of Change (test ROC) in Cumulative Oil Production (COP) or Recovery Factor (RF) over time;
   b) selecting n injection fluids based on an oil production rate at a given time $T_n$, wherein n is a number of fluid injection stages and switching to an n+1 injection fluid when said test ROC drops by a selected amount, thereby generating an injection fluid profile comprising a first injection fluid for $T_1$, a second injection fluid for $T_2$, up to an nth injection fluid for $T_n$;
   c) providing a well-pair in fluid communication in said reservoir, said well-pair comprising a horizontal injection well above and parallel to a horizontal production well;
   d) injecting said first selected injection fluid into said injection well at $T_1$ and producing heavy oil from said production well and measuring an actual oil production rate and an actual ROC in COP or RF over time;
   e) switching to injecting said second injection fluid into said injection well at $T_2$ when an actual ROC drops by said selected amount from an initial ROC and producing heavy oil from said production well; and
   f) repeating step e to $T_n$ and injecting said nth injection fluid and producing heavy oil from said production well.

2. The method of claim 1, wherein said switching step occurs when said selected amount is at least 40%.

3. The method of claim 1, wherein said switching step occurs when said selected amount is at least 50%.

4. The method of claim 3, wherein said injection fluid profile comprises:
   a) injecting either i) steam into said injection well or ii) butane at supercritical or superheated conditions;
   b) producing heavy oil from said production well;
   c) switching to injecting a hydrocarbon solvent into said injection well when said selected amount is at least 50%, said hydrocarbon solvent comprising butane or propane at saturation conditions;
   d) producing heavy oil until wind down; and
   e) injecting methane into said injection well and producing heavy oil and said hydrocarbon solvent from said production well.

5. The method of claim 3, wherein said injection fluid profile comprises:
   a) injecting steam into said injection well;
   b) producing heavy oil from said production well;
   c) switching to injecting a hydrocarbon solvent into said injection well when said selected amount is at least 50%, said hydrocarbon solvent comprising butane or propane at saturation conditions;
   d) producing heavy oil until wind down; and
   e) injecting methane into said injection well and producing heavy oil and said hydrocarbon solvent from said production well.

6. The method of claim 1, wherein said switching step occurs when said selected amount is at least 60%.

7. The method of claim 1, wherein said switching step occurs when said selected amount is at least 70%.

8. The method of claim 1, wherein said ROC of COP from $T_n$ to $T_{n+1}$ is $(COP_{n+1}-COP_n)/(T_{n+1}-T_n)$.

9. The method of claim 1, wherein said ROC of RF from $T_n$ to $t_{n+1}$ is $(RF_{n+1}-RF_n)/(T_{n+1}-T_n)$.

10. The method of claim 1, wherein said injection fluids are selected from steam, C1-4 hydrocarbons, non-condensable gases (NCG), and combinations thereof.

11. A method for producing heavy oil, said method comprising:
   a) testing or simulating a plurality of samples from a heavy oil reservoir in a temperature and pressure controlled gravity drainage experiment of a plurality of test injection fluids, by injecting a test injection fluid into a sample at RTP and measuring a test oil production rate and a test ROC in COP or RF over time;
   b) selecting n injection fluids selected from steam, C1-6 hydrocarbons, NCG, and combinations thereof, said selection based on an test oil production rate and test ROC at a given time $T_n$, wherein n is a number of fluid injection stages and switching to an n+1 injection fluid when said test ROC drops at least 40%, thereby generating an injection fluid profile comprising a first injection fluid for $T_1$, a second injection fluid for $T_2$, up to an nth injection fluid for $T_n$;
   c) providing a well-pair in fluid communication in said reservoir, said well-pair comprising a horizontal injection well above and parallel to a horizontal production well;
   d) injecting said first selected injection fluid into said injection well at $T_1$ and producing heavy oil from said production well and measuring an actual oil production rate and an actual ROC in COP or RF over time;
   e) switching to injecting said second injection fluid into said injection well at $T_2$ when said actual ROC drops at least 40% and producing heavy oil from said production well; and
   f) repeating step e to $T_n$ and injecting said nth injection fluid and producing heavy oil from said production well.

12. The method of claim 11, wherein said switching in steps b) and e) occurs when said test ROC and said actual ROC drops at least 50%.

13. The method of claim 11, wherein said switching in steps b) and e) occurs when said test ROC and said actual ROC drops at least 60%.

14. The method of claim 11, wherein said heavy oil is produced at a lower cost than a steam and solvent injection method without using said injection profile.

15. A method for producing heavy oil or bitumen, said method comprising:
   a) providing a well-pair in fluid communication in a heavy oil reservoir, said well-pair comprising a horizontal injection well above and parallel to a horizontal production well;
   b) injecting either i) steam into said injection well or ii) butane at supercritical or superheated conditions;
   c) producing heavy oil from said production well and measuring an actual ROC in COP or RF over time;
   d) switching to injecting a hydrocarbon solvent into said injection well when said ROC in COP or RF drops 30%-70%, said hydrocarbon solvent comprising butane or propane at saturation conditions;
   e) producing heavy oil until wind down; and
   f) injecting methane into said injection well and producing heavy oil and said hydrocarbon solvent from said production well.

16. The method of claim 15, wherein said injection well is disposed 5 meters above and parallel said production well.

17. The method of claim 15, wherein said injection well is disposed 5 meters directly above and parallel said production well.

18. The method of claim 15, wherein said switching step occurs when said ROC drops 40%-70%.

19. The method of claim 15, wherein said switching step occurs when said ROC drops 50%-70%.

20. The method of claim 15, wherein switching occurs when said test ROC and said actual ROC drops 60%-70%.

* * * * *